US010060399B2

(12) United States Patent
Namuduri et al.

(10) Patent No.: US 10,060,399 B2
(45) Date of Patent: Aug. 28, 2018

(54) METHOD AND APPARATUS FOR OPTIMUM DRIVE SIGNAL CONTROL OF AN ELECTROMAGNETICALLY-ACTIVATED ACTUATOR

(71) Applicants: Chandra S. Namuduri, Troy, MI (US); Suresh Gopalakrishnan, Troy, MI (US); Avoki M. Omekanda, Rochester, MI (US); Thomas W. Nehl, Shelby Township, MI (US)

(72) Inventors: Chandra S. Namuduri, Troy, MI (US); Suresh Gopalakrishnan, Troy, MI (US); Avoki M. Omekanda, Rochester, MI (US); Thomas W. Nehl, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 231 days.

(21) Appl. No.: 15/135,785

(22) Filed: Apr. 22, 2016

(65) Prior Publication Data

US 2017/0306907 A1  Oct. 26, 2017

(51) Int. Cl.
*F02M 51/06* (2006.01)
*F02M 63/00* (2006.01)
*H02K 33/16* (2006.01)
*F02D 41/20* (2006.01)

(52) U.S. Cl.
CPC ......... *F02M 51/0614* (2013.01); *F02D 41/20* (2013.01); *F02M 63/0017* (2013.01); *H02K 33/16* (2013.01); *F02D 2041/2034* (2013.01); *F02D 2041/2037* (2013.01); *F02D 2041/2051* (2013.01); *F02D 2041/2055* (2013.01)

(58) Field of Classification Search
CPC ...................................................... H02K 33/16
USPC ........................................................ 318/293
See application file for complete search history.

(56) References Cited

U.S. PATENT DOCUMENTS

| | | | | |
|---|---|---|---|---|
| 2,748,322 A | * | 5/1956 | Oswald | B66C 13/18 |
| | | | | 322/27 |
| 4,516,184 A | * | 5/1985 | Tominari | F02D 41/3005 |
| | | | | 361/152 |
| 5,287,048 A | * | 2/1994 | Lakin | F23N 5/245 |
| | | | | 110/193 |
| 9,435,281 B2 | * | 9/2016 | Parrish | F02D 41/20 |
| 9,500,835 B2 | * | 11/2016 | Kang | H04N 5/2257 |
| 9,624,883 B2 | * | 4/2017 | Namuduri | F02M 51/0689 |
| 9,932,947 B2 | * | 4/2018 | Nehl | F02M 51/0625 |

(Continued)

*Primary Examiner* — Sizo Vilakazi
*Assistant Examiner* — Kevin R Steckbauer (57) ABSTRACT

An electromagnetically-activated actuator includes an electrical coil, an armature moveable between rest and actuated positions, and a bi-directional driver. A method for controlling an actuator event includes applying a supply voltage at a first polarity across the coil for a first duration to drive a forward current through the coil effective to move the armature away from the rest position. The forward current has a forward current peak at the end of the first duration. After the first duration, the supply voltage is applied at a second polarity across the coil for a second duration to drive a reverse current through the coil. The second duration terminates when the reverse current attains a predetermined reverse current peak, wherein the predetermined reverse current peak is coincident with the armature returning to the rest position.

20 Claims, 6 Drawing Sheets

(56) References Cited

U.S. PATENT DOCUMENTS

| | | | |
|---|---|---|---|
| 2012/0316755 A1* | 12/2012 | Ibrahim | F02M 47/027 701/103 |
| 2015/0264237 A1* | 9/2015 | Kang | H04N 5/2257 348/208.2 |
| 2015/0267660 A1* | 9/2015 | Nehl | F02M 51/0625 361/160 |
| 2015/0267661 A1* | 9/2015 | Namuduri | F02M 51/0689 239/585.1 |
| 2015/0285175 A1* | 10/2015 | Parrish | F02D 41/20 123/480 |
| 2015/0377173 A1* | 12/2015 | Tritsch | F02D 41/20 123/476 |
| 2017/0179865 A1* | 6/2017 | Omekanda | F16K 31/0675 |
| 2017/0204805 A1* | 7/2017 | Nehl | F02D 41/402 |

\* cited by examiner

METHOD AND APPARATUS FOR OPTIMUM DRIVE SIGNAL CONTROL OF AN ELECTROMAGNETICALLY-ACTIVATED ACTUATOR

TECHNICAL FIELD

This disclosure is related to electromagnetically-activated actuators.

BACKGROUND

The statements in this section merely provide background information related to the present disclosure. Accordingly, such statements are not intended to constitute an admission of prior art.

Fuel injectors are used to directly inject pressurized fuel into combustion chambers of internal combustion engines. Known fuel injectors include electromagnetically-activated solenoid devices that overcome mechanical springs to open a valve located at a tip of the injector to permit fuel flow therethrough. Injector driver circuits control flow of electric current to the electromagnetically-activated solenoid devices to open and close the injectors. Injector driver circuits may operate in a peak-and-hold control configuration or a saturated switch configuration.

Fuel injectors are calibrated, with a calibration including an injector activation signal including an injector open-time, or injection duration, and a corresponding metered or delivered injected fuel mass operating at a predetermined or known fuel pressure. Injector operation may be characterized in terms of injected fuel mass per fuel injection event in relation to injection duration. Injector characterization includes metered fuel flow over a range between high flow rate associated with high-speed, high-load engine operation and low flow rate associated with engine idle conditions.

It is known to inject a plurality of small injected fuel masses in rapid succession for controlling an engine. Generally, when a dwell time between consecutive injection events is less than a dwell time threshold, injected fuel masses of subsequent fuel injection events often result in a larger delivered magnitude than what is desired even through equal injection durations are utilized. Accordingly, such subsequent fuel injection events can become unstable resulting in unacceptable repeatability. This undesirable occurrence is attributed to the existence of residual magnetic flux within the fuel injector that is produced by the preceding fuel injection event that offers some assistance to the immediately subsequent fuel injection event. The residual magnetic flux is produced in response to persistent eddy currents and magnetic hysteresis within the fuel injector. It is known to compensate for the effect of the larger than desired delivered magnitude of injected fuel mass solely by adjusting the injection duration of the subsequent injection event; however, the corresponding subsequent fuel injection may still become unstable resulting in unacceptable repeatability.

Current may be driven in a reverse direction to reduce valve closing delay caused by residual magnetic flux within the fuel injector. However, non-optimum reverse current drive will result in poor correlation of the fuel injector valve closing instant to the peak reverse current point. This may negatively impact precision fuel metering and injection control.

SUMMARY

An electromagnetically-activated actuator includes an electrical coil, an armature moveable between rest and actuated positions, and a bi-directional driver. A method for controlling an actuator event includes applying a supply voltage at a first polarity across the coil for a first duration to drive a forward current through the coil effective to move the armature away from the rest position. The forward current has a forward current peak at the end of the first duration. After the first duration, the supply voltage is applied at a second polarity across the coil for a second duration to drive a reverse current through the coil. The second duration terminates when the reverse current attains a predetermined reverse current peak, wherein the predetermined reverse current peak is coincident with the armature returning to the rest position.

BRIEF DESCRIPTION OF THE DRAWINGS

One or more embodiments will now be described, by way of example, with reference to the accompanying drawings, in which.

DETAILED DESCRIPTION

This disclosure describes the concepts of the presently claimed subject matter with respect to an exemplary application to linear motion fuel injectors. However, the claimed subject matter is more broadly applicable to any linear or non-linear electromagnetic actuator that employs an electrical coil for inducing a magnetic field within a magnetic core resulting in an attractive force acting upon a movable armature. Typical examples include fluid control solenoids, gasoline or diesel or CNG fuel injectors employed on internal combustion engines and non-fluid solenoid actuators for positioning and control.

Figure 1A:
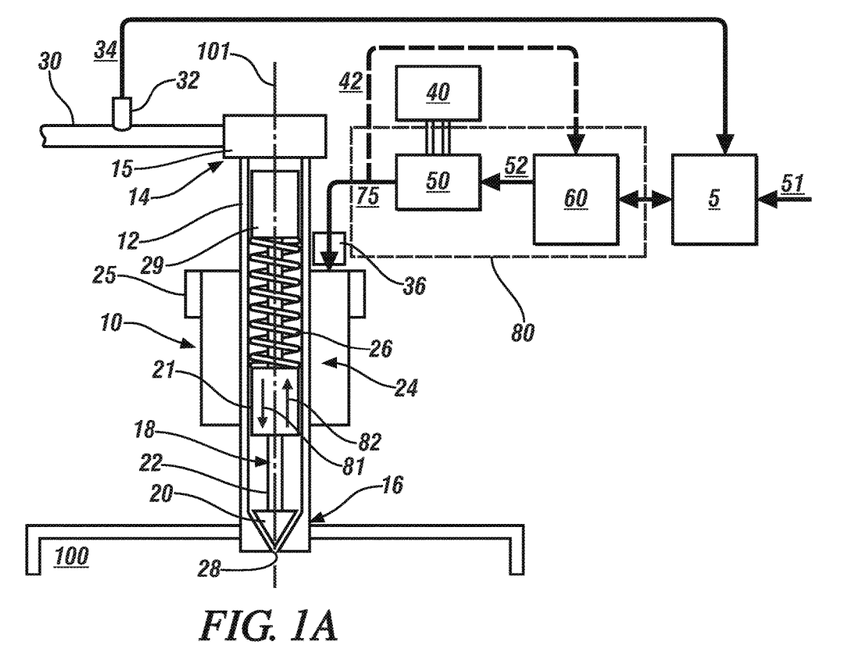
FIG. 1A illustrates a schematic sectional view of a fuel injector and an activation controller, in accordance with the present disclosure.

Referring now to the drawings, wherein the showings are for the purpose of illustrating certain exemplary embodiments only and not for the purpose of limiting the same, FIG. 1A schematically illustrates a non-limiting exemplary embodiment of an electromagnetically-activated direct-injection fuel injector 10. While an electromagnetically-activated direct-injection fuel injector is depicted in the illustrated embodiment, a port-injection fuel injector is equally applicable. The fuel injector 10 is configured to inject fuel directly into a combustion chamber 100 of an internal combustion engine. An activation controller 80 electrically operatively connects to the fuel injector 10 to control activation thereof. The activation controller 80 corresponds to only the fuel injector 10. In the illustrated embodiment, the activation controller 80 includes a control module 60 and an injector driver 50. The control module 60 electrically operatively connects to the injector driver 50 that electrically operatively connects to the fuel injector 10 to control activation thereof. The fuel injector 10, control module 60 and injector driver 50 may be any suitable devices that are configured to operate as described herein. In the illustrated embodiment, the control module 60 includes a processing device. In one embodiment, one or more components of the activation controller 80 are integrated within a connection assembly 36 of the fuel injector 10. In another embodiment, one or more components of the activation controller 80 are integrated within a body 12 of the fuel injector 10. In even yet another embodiment, one or more components of the activation controller 80 are external to, and in close proximity with, the fuel injector 10 and electrically operatively connected to the connection assembly 36 via one or more cables and/or wires. The terms "cable" and "wire" will be used interchangeably herein to provide transmission of electrical power and/or transmission of electrical signals.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

In general, an armature is controllable to one of an actuated position and a static or rest position. The fuel injector 10 may be any suitable discrete fuel injection device that is controllable to one of an open (actuated) position and a closed (static or rest) position. In one embodiment, the fuel injector 10 includes a cylindrically-shaped hollow body 12 defining a longitudinal axis 101. A fuel inlet 15 is located at a first end 14 of the body 12 and a fuel nozzle 28 (the fuel nozzle maybe a single opening or multiple holes in the case of a ball shaped valve) is located at a second end 16 of the body 12. The fuel inlet 15 is fluidly coupled to a high-pressure fuel line 30 that fluidly couples to a high-pressure injection pump. A valve assembly 18 is contained in the body 12, and includes a needle valve 20, a spring-activated pintle 22 and an armature portion 21. The needle valve 20 interferingly seats in the fuel nozzle 28 to control fuel flow therethrough. While the illustrated embodiment depicts a triangularly-shaped needle valve 20, other embodiments may utilize a ball. In one embodiment, the armature portion 21 is fixedly coupled to the pintle 22 and configured to linear translate as a unit with the pintle 22 and the needle valve 20 in first and second directions 81, 82, respectively. In another embodiment, the armature portion 21 may be slidably coupled to the pintle 22. For instance, the armature portion 21 may slide in the first direction 81 until being stopped by a pintle stop fixedly attached to the pintle 22. Likewise, the armature portion 21 may slide in the second direction 82 independent of the pintle 22 until contacting a pintle stop fixedly attached to the pintle 22. Upon contact with the pintle stop fixedly attached to the pintle 22, the force of the armature portion 21 causes the pintle 22 to be urged in the second direction 82 with the armature portion 21. The armature portion 21 may include protuberances to engage with various stops within the fuel injector 10.

An annular electromagnet assembly 24, including an electrical coil and magnetic core, is configured to magnetically engage the armature portion 21 of the valve assembly. The electrical coil and magnetic core assembly 24 is depicted for illustration purposes to be outside of the body of the fuel injector; however, embodiments herein are directed toward the electrical coil and magnetic core assembly 24 to be either integral to, or integrated within, the fuel injector 10. The electrical coil is wound onto the magnetic core, and includes terminals for receiving electrical current from the injector driver 50. Hereinafter, the "electrical coil and magnetic core assembly" will simply be referred to as an "electrical coil 24". When the electrical coil 24 is deactivated and de-energized, the spring 26 urges the valve assembly 18 including the armature and needle valve 20 toward the fuel nozzle 28 in the first direction 81 to close the needle valve 20 into the rest position and prevent fuel flow therethrough. When the electrical coil 24 is activated and energized, electromagnetic force (herein after "magnetic force") acts on the armature portion 21 to overcome the spring force exerted by the spring 26 and urges the valve assembly 18 in the second direction 82, moving the armature and needle valve 20 away from the fuel nozzle 28 and permitting flow of pressurized fuel within the valve assembly 18 to flow through the fuel nozzle 28. The fuel injector 10 may include a stopper 29 that interacts with the valve assembly 18 to stop translation of the valve assembly 18 when it is actuated and urged to open. In one embodiment, a pressure sensor 32 is configured to obtain fuel pressure 34 in the high-pressure fuel line 30 proximal to the fuel injector 10, preferably upstream of the fuel injector 10. In another embodiment, a pressure sensor may be integrated within the inlet 15 of the fuel injector in lieu of the pressure sensor 32 in the fuel rail 30 or in combination with the pressure sensor. The fuel injector 10 in the illustrated embodiment of FIG. 1A is not limited to the spatial and geometric arrangement of the features described herein, and may include additional features and/or other spatial and geometric arrangements known in the art for operating the fuel injector 10 between open and closed positions for controlling the delivery of fuel to the engine 100.

The control module 60 generates an injector command (actuator command) signal 52 that controls the injector driver 50, which activates the fuel injector 10 to the open position for affecting a fuel injection event. In the illustrated embodiment, the control module 60 communicates with one or more external control modules such as an engine control module (ECM) 5; however, the control module 60 may be integral to the ECM in other embodiments. The injector command signal 52 correlates to a desired mass of fuel to be delivered by the fuel injector 10 during the fuel injection event. Similarly, the injector command signal 52 may correlate to a desired fuel flow rate to be delivered by the fuel injector 10 during the fuel injection event. As used herein, the term "desired injected fuel mass" refers to the desired mass of fuel to be delivered to the engine by the fuel injector 10. As used herein, the term "desired fuel flow rate" refers to the rate at which fuel is to be delivered to the engine by the fuel injector 10 for achieving the desired mass of fuel. The desired injected fuel mass can be based upon one or more monitored input parameters 51 input to the control module 60 or ECM 5. The one or more monitored input parameters 51 may include, but are not limited to, an operator torque request, manifold absolute pressure (MAP), engine speed, engine temperature, fuel temperature, and ambient temperature obtained by known methods. The injector driver 50 generates an injector activation (actuator activation) signal 75 in response to the injector command signal 52 to activate the fuel injector 10. The injector activation signal 75 controls current flow to the electrical coil 24 to generate electromagnetic force in response to the injector command signal 52. An electric power source 40 provides a source of DC electric power for the injector driver 50. In some embodiments, the DC electric power source provides low voltage, e.g., 12 V, and a boost converter may be utilized to output a high voltage, e.g., 24V to 200 V, that is supplied to the injector driver 50. When activated using the injector activation signal 75, the electromagnetic force generated by the electrical coil 24 urges the armature portion 21 in the second direction 82. When the armature portion 21 is urged in the second direction 82, the valve assembly 18 is consequently caused to urge or translate in the second direction 82 to an actuated or open position, allowing pressurized fuel to flow therethrough. The injector driver 50 controls the injector activation signal 75 to the electrical coil 24 by any suitable method, including, e.g., pulsewidth-modulate (PWM) electric power flow. The injector driver 50 is configured to control activation of the fuel injector 10 by generating suitable injector activation signals 75. In embodiments that employ a plurality of successive fuel injection events for a given engine cycle, an injector activation signal 75 that is fixed for each of the fuel injection events within the engine cycle may be generated.

The injector activation signal 75 is characterized by an injection duration and a current waveform that includes an initial peak pull-in current and a secondary hold current. The initial peak pull-in current is characterized by a steady-state ramp up to achieve a peak current, which may be selected as described herein. The initial peak pull-in current generates electromagnetic force that acts on the armature portion 21 of the valve assembly 18 to overcome the spring force and urge the valve assembly 18 in the second direction 82 to the open position, initiating flow of pressurized fuel through the fuel nozzle 28. When the initial peak pull-in current is achieved, the injector driver 50 reduces the current in the electrical coil 24 to the secondary hold current. The secondary hold current is characterized by a somewhat steady-state current that is less than the initial peak pull-in current. The secondary hold current is a current level controlled by the injector driver 50 to maintain the valve assembly 18 in the open position to continue the flow of pressurized fuel through the fuel nozzle 28. The secondary hold current is preferably indicated by a minimum current level. When very small fuel quantities are required, the activation current waveform will not reach peak pull-in current and the current hold phase will be omitted in that case. The injector driver 50 is configured as a bi-directional current driver capable of providing a negative current flow for drawing current from the electrical coil 24. As used herein, the term "negative current flow" refers to the direction of the current flow for energizing the electrical coil to be reversed. Accordingly, the terms "negative current flow" and "reverse current flow" are used interchangeably herein.

Embodiments herein are directed toward controlling the fuel injector for a plurality of fuel injection events that are closely-spaced during an engine cycle. As used herein, the term "closely-spaced" refers to a dwell time between each consecutive fuel injection event being less than a predetermined dwell time threshold. As used herein, the term "dwell time" refers to a period of time between an end of injection for the first fuel injection event (actuator event) and a start of injection for a corresponding second fuel injection event (actuator event) of each consecutive pair of fuel injection events. The dwell time threshold can be selected to define a period of time such that dwell times less than the dwell time threshold are indicative of producing instability and/or deviations in the magnitude of injected fuel mass delivered for each of the fuel injection events. The instability and/or deviations in the magnitude of injected fuel mass may be responsive to a presence of secondary magnetic effects. The secondary magnetic effects include persistent eddy currents and magnetic hysteresis within the fuel injector and a residual flux based thereon. The persistent eddy currents and magnetic hysteresis are present due to transitions in initial flux values between the closely-spaced fuel injection events. Accordingly, the dwell time threshold is not defined by any fixed value, and selection thereof may be based upon, but not limited to, fuel temperature, fuel injector temperature, fuel injector type, fuel pressure and fuel properties such as fuel types and fuel blends. As used herein, the term "flux" refers to magnetic flux indicating the total magnetic field generated by the electrical coil 24 and passing through the armature portion. Since the turns of the electrical coil 24 link the magnetic flux in the magnetic core, this flux can therefore be equated from the flux linkage. The flux linkage is based upon the flux density passing through the armature portion, the surface area of the armature portion adjacent to the air gap and the number of turns of the coil 24. Accordingly, the terms "flux", "magnetic flux" and "flux linkage" will be used interchangeably herein unless otherwise stated.

For fuel injection events that are not closely spaced, a fixed current waveform independent of dwell time may be utilized for each fuel injection event because the first fuel injection event of a consecutive pair has little influence on the delivered injected fuel mass of the second fuel injection event of the consecutive pair. However, the first fuel injection event may be prone to influence the delivered injected fuel mass of the second fuel injection event, and/or further subsequent fuel injection events, when the first and second fuel injection events are closely-spaced and a fixed current wave form is utilized. Any time a fuel injection event is influenced by one or more preceding fuel injection events of an engine cycle, the respective delivered injected fuel mass of the corresponding fuel injection event can result in an unacceptable repeatability over the course of a plurality of engine cycles and the consecutive fuel injection events are considered closely-spaced. More generally, any consecutive actuator events wherein residual flux from the preceding actuator event affects performance of the subsequent actuator event relative to a standard, for example relative to performance in the absence of residual flux, are considered closely-spaced.

Exemplary embodiments are further directed toward providing feedback signal(s) 42 from the fuel injector 10 to the activation controller 80. Discussed in greater detail below, sensor devices may be integrated within the fuel injector 10 for measuring various fuel injector parameters for obtaining the flux linkage of the electrical coil 24, voltage of the electrical coil 24 and current through the electrical coil 24. A current sensor may be provided on a current flow path between the activation controller 80 and the fuel injector to measure the current provided to the electrical coil 24, or the current sensor can be integrated within the fuel injector 10 on the current flow path. The fuel injector parameters provided via feedback signal(s) 42 may include the flux linkage, voltage and current directly measured by corresponding sensor devices integrated within the fuel injector 10. Additionally or alternatively the fuel injector parameters may include proxies provided via feedback signal(s) 42 to, and used by, the control module 60 to estimate the flux linkage, magnetic flux, the voltage, and the current within the fuel injector 10. Having feedback of the flux linkage of the electrical coil 24, the voltage of the electrical coil 24 and current provided to the electrical coil 24, the control module 60 may advantageously modify the activation signal 75 to the fuel injector 10 for multiple consecutive injection events. It will be understood that conventional fuel injectors controlled by open loop operation, are based solely upon a desired current waveform obtained from look-up tables, without any information related to the force producing component of the flux linkage (e.g., magnetic flux) affecting movement of the armature portion 21. As a result, conventional feed-forward fuel injectors that only account for current flow for controlling the fuel injector may be susceptible to instability in consecutive fuel injection events that are closely-spaced.

It is known when the injector driver 50 only provides current uni-directionally in a positive first direction to energize the electrical coil 24, releasing the current to remain stable at zero will result in the magnetic flux within the fuel injector to gradually decay, e.g., taper off, towards zero. However, the response time for the magnetic flux to decay is slow, and the presence of magnetic hysteresis within the fuel injector often results in the presence of residual flux when a subsequent closely-spaced fuel injection event is initiated. As aforementioned, the presence of the residual flux impacts the accuracy of the fuel flow rate and injected fuel mass to be delivered in a subsequent closely-spaced fuel injection event.

Figure 1B:
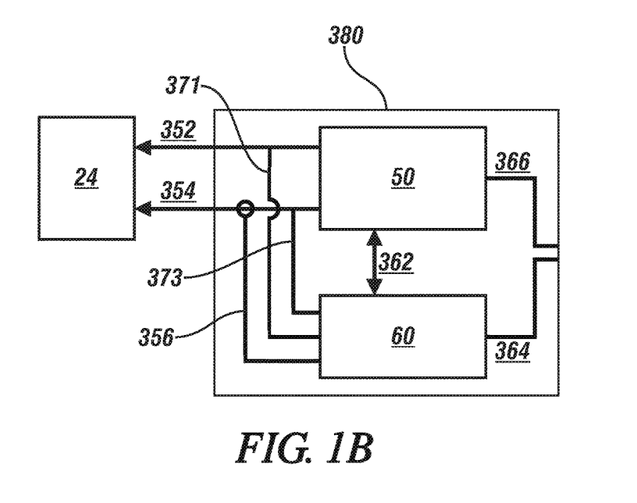
FIG. 1B illustrates a schematic sectional view of the activation controller of FIG. 1A, in accordance with the present disclosure.

FIG. 1B illustrates the activation controller 80 of FIG. 1A. Signal flow path 362 provides communication between the control module 60 and the injector driver 50. For instance, signal flow path 362 provides the injector command signal (e.g., command signal 52 of FIG. 1 that controls the injector driver 50. The control module 60 further communicates with the external ECM 5 via signal flow path 364 within the activation controller 380 that is in electrical communication with a power transmission cable. For instance, signal flow path 364 may provide monitored input parameters (e.g., monitored input parameters 51 of FIG. 1 from the ECM 5 to the control module 60 for generating the injector command signal 52. In some embodiments, the signal flow path 364 may provide feedback fuel injector parameters (e.g., feedback signal(s) 42 of FIG. 1 to the ECM 5.

The injector driver 50 receives DC electric power from the power source 40 of FIG. 1A via a power supply flow path 366. The signal flow path 364 can be eliminated by use of a small modulation signal added to the power supply flow path 366. Using the received DC electric power, the injector driver 50 may generate injector activation signals (e.g., injector activation signals 75 of FIG. 1A) based on the injector command signal from the control module 60.

The injector driver 50 is configured to control activation of the fuel injector 10 by generating suitable injector activation signals 75. The injector driver 50 is a bi-directional current driver providing positive current flow via a first current flow path 352 and negative current flow via a second current flow path 354 to the electrical coil 24 in response to respective injector activation signals 75. The positive current via the first current flow path 352 is provided to energize an electrical coil 24 and the negative current via the second current flow path 354 reverses current flow to draw current from the electrical coil 24. Current flow paths 352 and 354 form a closed loop; that is, a positive current into 352 results in an equal and opposite (negative) current in flow path 354, and vice versa. Signal flow path 371 can provide a voltage of the first current flow path 352 to the control module 60 and signal flow path 373 can provide a voltage of the second current flow path 354 to the control module 60. The voltage and current applied to the electrical coil 24 is based on a difference between the voltages at the signal flow paths 371 and 373. In one embodiment, the injector driver 50 utilizes open loop operation to control activation of the fuel injector 10, wherein the injector activation signals are characterized by precise predetermined current waveforms. In another embodiment, the injector driver 50 utilizes closed loop operation to control activation of the fuel injector 10, wherein the injector activation signals are based upon fuel injector parameters provided as feedback to the control module, via the signal flow paths 371 and 373. A measured current flow to the coil 24 can be provided to the control module 60, via signal flow path 356. In the illustrated embodiment, the current flow is measured by a current sensor on the second current flow path 354. The fuel injector parameters may include flux linkage, voltage and current values within the fuel injector 10 or the fuel injector parameters may include proxies used by the control module 60 to estimate flux linkage, voltage and current within the fuel injector 10.

Figure 1C:
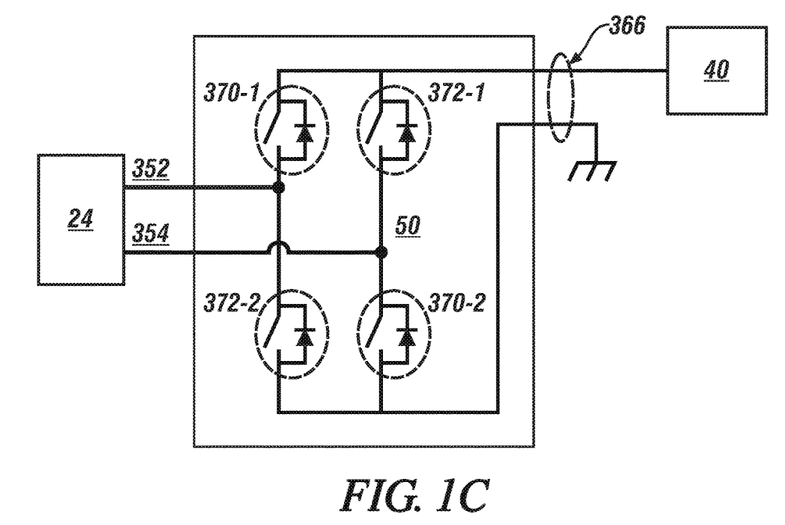
FIG. 1C illustrates a schematic sectional view of an injector driver of FIGS. 1A and 1B, in accordance with the present disclosure.

In some embodiments, the injector driver 50 is configured for full four quadrant operation. FIG. 1C illustrates an exemplary embodiment of the injector driver 50 of FIG. 1B utilizing two switch sets 370 and 372 to control the current flow provided between the injector driver 50 and the electrical coil 24. In the illustrated embodiment, the first switch set 370 includes switch devices 370-1 and 370-2 and the second switch set 372 includes switch devices 372-1 and 372-2. The switch devices 370-1, 370-2, 372-1, 372-2 can be solid state switches and may include Silicon (Si) or wide band gap (WBG) semiconductor switches enabling high speed switching at high temperatures. The four quadrant operation of the injector driver 50 controls the direction of current flow into and out of the electrical coil 24 based upon a corresponding switch state determined by the control module 60. The control module 60 may determine a positive switch state, a negative switch state and a zero switch state and command the first and second switch sets 370 and 372 between open and closed positions based on the determined switch state. In the positive switch state, the switch devices 370-1 and 370-2 of the first switch set 370 are commanded to the closed position and the switch devices 372-1 and 372-2 of the second switch set 372 are commanded to the open position to control positive current into the first current flow path 352 and out of the second current flow path 354. These switch devices may be further modulated using pulse width modulation to control the amplitude of the current. In the negative switch state, the switch devices 370-1 and 370-2 of the first switch set 370 are commanded to the open position and the switch devices 372-1 and 372-2 of the second switch set 372 are commanded to the closed position to control negative current into the second current flow path 354 and out of the first current flow path 352. These switch devices may be further modulated using pulse width modulation to control the amplitude of the current. In the zero switch state, all the switch devices 370-1, 370-2, 372-1, 372-2 are commanded to the open position to control no current into or out of the electromagnetic assembly. Thus, bi-directional control of current through the coil 24 may be effected.

In some embodiments, the negative current for drawing current from the electrical coil 24 is applied for a sufficient duration for reducing residual flux within the fuel injector 10 after current is released. In other embodiments, the negative current is applied subsequent to release of the current but additionally only after the fuel injector has closed or actuator has returned to its static or rest position. Moreover, additional embodiments can include the switch sets 370 and 372 to be alternately switched between open and closed positions to alternate the direction of the current flow to the coil 24, including pulse width modulation control to effect current flow profiles. The utilization of two switch sets 370 and 372 allows for precise control of current flow direction and amplitude applied to the current flow paths 352 and 354 of the electrical coil 24 for multiple consecutive fuel injection events during an engine event by reducing the presence of eddy currents and magnetic hysteresis within the electrical coil 24.

Figure 2:
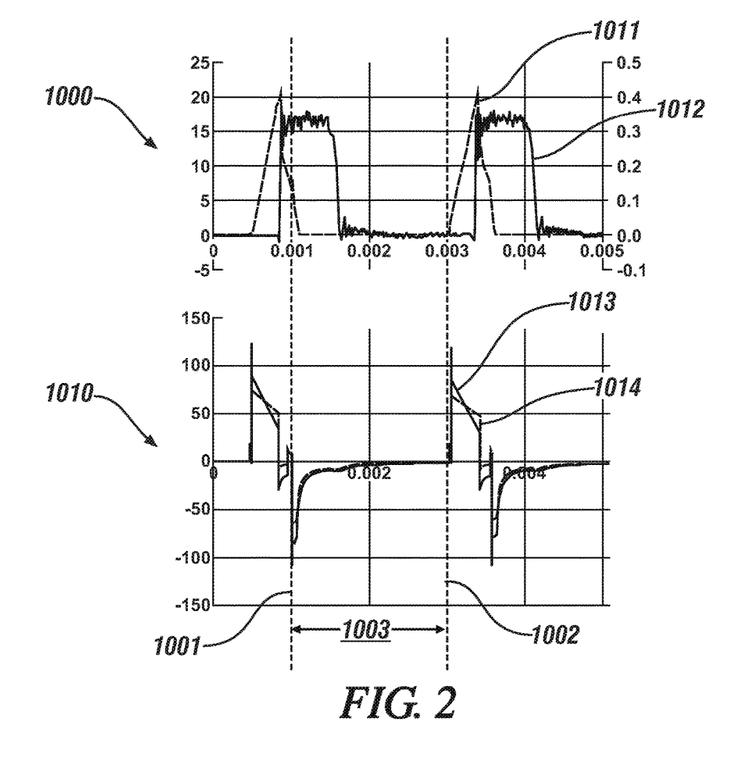
FIG. 2 illustrates a non-limiting exemplary first plot of measured current and fuel flow rate and a non-limiting exemplary second plot of measured main excitation coil and search coil voltages for two successive fuel injection events having identical current pulses that are separated by a dwell time that is not indicative of being closely spaced, in accordance with the present disclosure.

FIG. 2 illustrates a non-limiting exemplary first plot 1000 of measured current and fuel flow rate and a non-limiting exemplary second plot 1010 of measured main excitation coil and search coil voltages for two successive fuel injection events having identical current pulses that are separated by a dwell time that is not indicative of being closely spaced, in accordance with the present disclosure. Dashed vertical line 1001 extending through each of plots 1000 and 1010 represents a first time whereat an end of injection for the first fuel injection event occurs and dashed vertical line 1002 represents a second time whereat a start of injection for the second fuel injection event occurs. The dwell time 1003 represents a period of time between dashed vertical lines 1001 and 1002 separating the first and second fuel injection events. In the illustrated embodiment, the dwell time exceeds a dwell time threshold. Thus, the first and second fuel injection events are not indicative of being closely-spaced.

Referring to the first plot 1000, measured current and flow rate profiles 1011, 1012, respectively, are illustrated for the two fuel injection events. The vertical y-axis along the left side of plot 1000 denotes electrical current in Amperage (A) and the vertical y-axis along the right side of plot 1000 denotes fuel flow rate in milligrams (mg) per milliseconds (ms). The measured current profile 1011 is substantially identical for each of the fuel injection events. Likewise, the measured fuel flow rate profile 1012 is substantially identical for each of the fuel injection events due to the fuel injection events not indicative of being closely-spaced.

Referring to the second plot 1010, measured main excitation coil and search coil voltage profiles 1013, 1014, respectively, are illustrated for the two fuel injection events. The measured main coil voltage may represent a measured voltage of the electromagnetic coil 24 of FIG. 1A and the measured search coil voltage may represent a measured voltage of a search coil 25 mutually magnetically coupled to the electrical coil 24 of FIG. 1A. The vertical y-axis of plot 1010 denotes voltage (V). Accordingly, when the main excitation coil is energized, magnetic flux generated by the main excitation coil may be linked to the search coil due to the mutual magnetic coupling. The measured search coil voltage profile 1014 indicates the voltage induced in the search coil which is proportional to the rate of change of the mutual flux-linkage. The measured main excitation coil and search coil voltage profiles 1013, 1014, respectively, of plot 1010 are substantially identical for each of the first and second fuel injection events that are not indicative of being closely-spaced.

Figure 3:
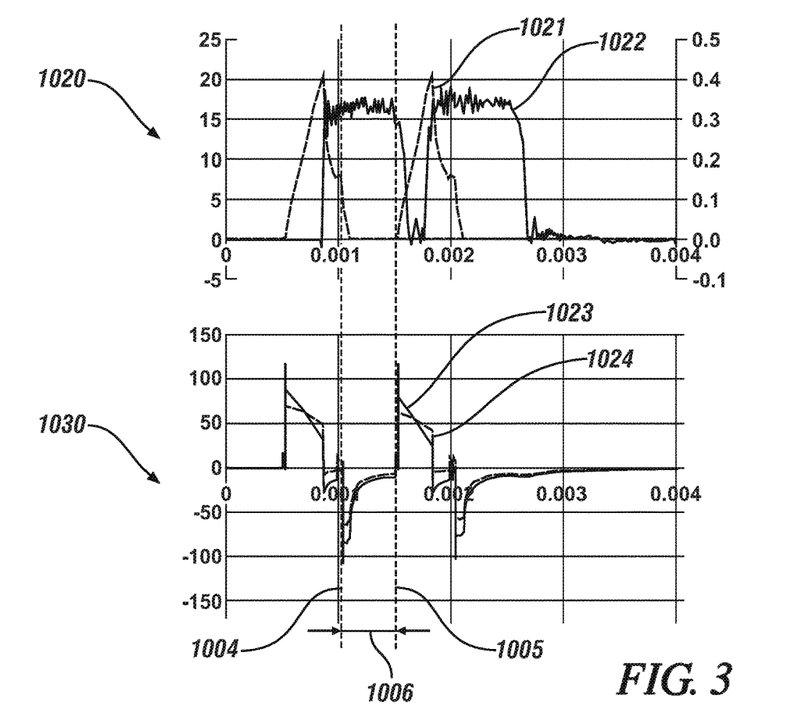
FIG. 3 illustrates a non-limiting exemplary first plot of measured current and fuel flow rate and a non-limiting exemplary second plot of measured main excitation coil and search coil voltages for two successive fuel injection events having identical current pulses that are separated by a dwell time that is indicative of being closely spaced, in accordance with the present disclosure.

FIG. 3 illustrates a non-limiting exemplary first plot 1020 of measured current and fuel flow rate and a non-limiting exemplary second plot 1030 of measured main excitation coil and search coil voltages for two successive fuel injection events having identical current pulses that are separated by a dwell time that is indicative of being closely spaced, in accordance with the present disclosure. The horizontal x-axis in each of plots 1020 and 1030 denotes time in seconds (s). Dashed vertical line 1004 extending through each of plots 1020 and 1030 represents a first time whereat an end of injection for the first fuel injection event occurs and dashed vertical line 1005 represents a second time whereat a start of injection for the second fuel injection event occurs. The dwell time 1006 represents a period of time between dashed vertical lines 1004 and 1005 separating the first and second fuel injection events. In the illustrated embodiment, the dwell time is less than a dwell time threshold. Thus, the first and second fuel injection events are indicative of being closely-spaced.

Referring to the first plot 1020, measured current and flow rate profiles 1021, 1022, respectively, are illustrated for the two fuel injection events. The vertical y-axis along the left side of plot 1020 denotes electrical current in Amperage (A) and the vertical y-axis along the right side of plot 1020 denotes fuel flow rate in milligrams (mg) per millisecond (ms). The measured current profile 1021 is substantially identical for each of the fuel injection events. However, the measured flow rate profile 1022 illustrates a variation in the measured fuel flow rate between each of the first and second fuel injection events even though the measured current profiles are substantially identical. This variance in the measured fuel flow rate is inherent in closely-spaced fuel injection events and undesirably results in an injected fuel mass delivered at the second fuel injection event that is different than an injected fuel mass delivered at the first fuel injection event.

Referring to the second plot 1030, measured main excitation coil and search coil voltage profiles 1023, 1024, respectively, are illustrated for the two fuel injection events. The measured main coil voltage may represent a measured voltage of the electrical coil 24 of FIG. 1A and the measured search coil voltage may represent a measured voltage of a search coil 25 mutually magnetically coupled to the electrical coil 24 of FIG. 1A. The vertical y-axis of plot 1030 denotes voltage (V). Accordingly, when the main excitation coil is energized, magnetic flux generated by the main excitation coil may be linked to the search coil due to the mutual magnetic coupling. The measured search coil voltage profile 1024 indicates the voltage induced in the search coil which is proportional to the rate of change of the mutual flux-linkage. The measured main excitation coil and search coil voltage profiles 1023, 1024, respectively, of plot 1030 deviate during the second injection event in comparison to the first fuel injection event. This deviation is indicative of the presence of residual flux or magnetic flux when the injection events are closely-spaced. Referring to plot 1010 of FIG. 2 the measured main excitation coil and search coil voltage profiles 1013, 1014, respectively do not deviate during the second injection event in comparison to the first fuel injection event when the first and second fuel injection events are not closely-spaced.

A start of injection (SOI) time and an end of injection (EOI) time can each be sensed based upon discernible changes in monitored parameters of the fuel injection. The SOI time is indicative of a time point whereat the injector begins to open for delivering fuel (release from rest position). The SOI time can interchangeably be referred to as an actual injector opening time. In some embodiments, the SOI time corresponds to a time point indicating a discernible decrease in the fuel pressure 34 proximal to the fuel injector. However, this disclosure is not limited to any one method for determining the SOI time, and any method can be utilized to obtain the SOI time such as by referencing residual voltage. As aforementioned, fuel pressure can be measured by the fuel sensor 32 at the fuel rail 30 of FIG. 1A or fuel pressure can be measured by a fuel sensor located within the inlet 15 of the fuel injector 10. The EOI time is indicative of a time point whereat the injector is closed and the delivery of fuel is stopped. The EOI time can interchangeably be referred to as an actual injector closing time (return to rest position). The EOI time may be selected as a time which corresponds to a time point indicating a discernible residual voltage inflection point in voltage across the electrical coil 24. The voltage across the electrical coil 24 may be obtained by a corresponding sensor integrated within the fuel injector and provided to the control module 60 via the feedback signal(s) 42. Likewise, obtained fuel injector parameters may include proxies provided via the feedback signal(s) 42 to, and used by, the control module 60 to estimate the voltage within the fuel injector 10 (e.g., across the electrical coil 24). Accordingly, the control module 60 can determine discernible residual voltage inflection point based upon the obtained voltage across the electrical coil 24.

In a closely spaced multiple small quantity injection system, the second and subsequent fuel injections become unstable due to the secondary magnetic effects such as eddy currents and hysteresis (residual flux). With conventional injector drives using only current control it is difficult to achieve stable multiple fuel injections making the scheme not very effective. In addition, the fuel mass injected in a fixed pulse with single or multi-pulse injection is not deterministic due to injector-to-injector variability. In the conventional current regulated system, as aforementioned, the valve closing event is correlated with an inflection point in the induced voltage of the injector driver coil after the coil current is shut-off and reduced to zero. This results in significant delay between the voltage inflection point and the valve closing instant. In current regulated systems using reverse current drive the valve closing delay is reduced, however, this non-optimum reverse current drive results in poor correlation of the valve closing instant to the peak reverse current point or the coil voltage inflection point. Additionally, determination of the valve closing time based on voltage inflection point requires complex signal processing with higher order derivatives and may be susceptible to noise and injector design variations.

By determining an optimum drive signal for a fuel injector such that the valve closing event correlates directly with a predetermined level of the drive signal a more precise fuel rate control is enabled. In a preferred embodiment, the valve closing event correlates directly with the instant of the injector coil current reaching an optimum peak reverse current. This enables precision fuel metering and injection control, minimizes calibration requirements of fuel delivery control and simplifies controller hardware and software requirements. Additionally, it may potentially reduce fuel consumption and emissions.

An optimum injector drive utilizes a driver that is capable of applying injector coil current and/or voltage in a first direction for opening the valve and in a direction opposite to the first direction after the injector has been commanded off. An exemplary driver is an H-bridge driver with 4 solid-state switches with free-wheeling diodes across them. One embodiment of this exemplary driver is depicted in FIG. 1C. The duration of the reverse voltage after the injector has been commanded off is determined based on the time it takes the coil current to reach a predetermined value in the reverse direction. In one embodiment, the predetermined reverse current is so selected that when the reverse voltage is switched off at the instant the reverse current reaches said predetermined value in the reverse direction, the coil voltage returns to zero in the shortest time without having any further undershoot after being clamped in the forward direction at the supply voltage until the current is reduced to zero. In another embodiment, the predetermined reverse current is so selected that when the reverse voltage is switched off at the instant the reverse current reaches the predetermined value in the reverse direction, and a next closely spaced injection with equal commanded duration is initiated, the next peak current in the first direction reaches within a predetermined band of the previous peak current in the same direction. In another embodiment, the predetermined reverse current is so selected that when the reverse voltage is switched off at the instant the reverse current reaches the predetermined value in the reverse direction, the flux linking the coil reaches a predetermined value in the second direction within a predetermined time.

It is conceivable that the predetermined reverse current can be a function of the injector design, operating fuel line pressure, the supply voltage, injection duration and the spacing between successive injections. With the predetermined reverse current so selected, the closing instant of the valve is directly correlated to the instant the coil current reaches the predetermined level in the reverse direction. In an exemplary embodiment, the opening instant of the valve may be correlated to the instant the valve current reaches its peak value in the first direction. Thus the actual injection duration may be directly correlated to the time difference between the instants where the injector coil current reached its peak value in a first direction and the predetermined peak current in the second, reverse direction.

Figure 4:
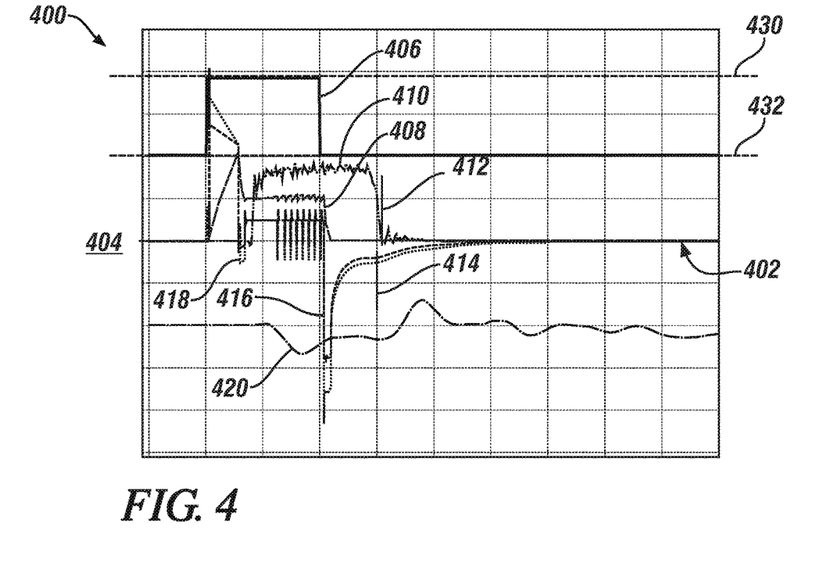
FIG. 4 illustrates a plot of fuel injector parameters corresponding to an exemplary fuel injection event utilizing a fuel injection drive in which the fuel injector valve closing time is correlated to an inflection point in the injector solenoid coil voltage after the coil current is turned off and falls to zero, in accordance with the present disclosure.

FIG. 4 is directed toward a plot 400 of fuel injector parameters corresponding to a fuel injection event utilizing a fuel injection drive in which the fuel injector valve closing time is correlated to an inflection point in the injector solenoid coil voltage after the coil current is turned off and falls to zero. Here the fuel injector drive uses the discernible residual voltage inflection point for determining stability in a fuel injection event between engine cycles as well as the EOI time of the fuel injection event. The horizontal x-axis 402 of plot 400 is measured in time. The vertical y-axis 404 is measured in differing units based on parameter being monitored. The driver command 406 is shown being switched between an inactive state 432 to an active state 430. When the driver command 406 is switched to the active state 430 the coil voltage 416 and search coil voltage 418 are shown to increase. Both the coil voltage 416 and search coil voltage 418 are measured in volts along y-axis 404 in relation to time 402. The coil current (amperes) 408 increases accordingly following driver command 406 being switched to an active state 430. The fuel injector reacts to the driver command 406 and begins injecting fuel as depicted by fuel rate 410. Fuel line pressure 420 is additionally depicted over time 402. When the driver command 406 is switched to an inactive state 432 the coil current is turned off and falls to zero. When the fuel valve closes at instant 412, the voltage inflection point 414 is achieved. The fuel injector valve closing time 412 is correlated to the inflection point 414 in the injector solenoid coil voltage after the coil current is turned off and falls to zero.

A fuel injection event can be indicative of being stable if the residual voltage inflection point 414 repeatedly occurs at or around a same time point in each engine cycle. However, a fuel injection event can be indicative of being unstable if the residual voltage inflection point 414 occurs at non-repeating, or otherwise inconsistent, time points between each engine cycle. In other words a variable residual voltage inflection point 414 indicating that the residual voltage inflection point varies from engine cycle to engine cycle can indicate that the corresponding fuel injection event is unstable. Unstable fuel injection events undesirably result in deviations from a desired injected fuel mass to be delivered at the fuel injection event during the engine cycles. Generally, when a plurality of fuel injection events during each of a plurality of engine cycles are indicative of being closely-spaced, one or more fuel injection events subsequent to the first fuel injection event can result in deviations from a desired injected fuel mass. Additionally, the EOI time determined from the residual voltage inflection point and the obtained SOI time determined from the discernible change in fuel pressure or other method, can be utilized to calculate an actual injector duration such that the injected fuel mass actually delivered can be estimated.

Figure 5:
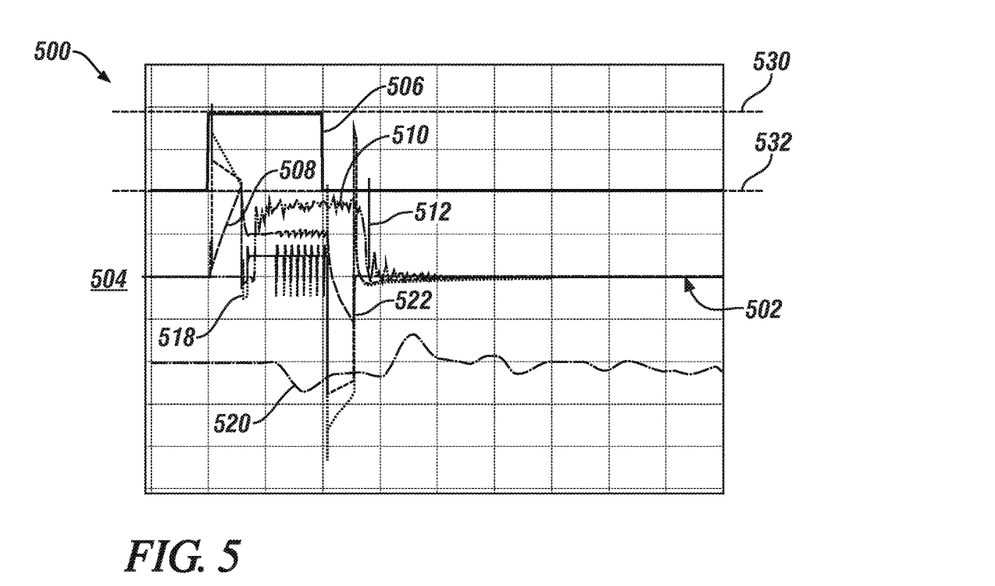
FIG. 5 illustrates a plot of fuel injector parameters corresponding to an exemplary fuel injection event utilizing a non-optimum reverse current fuel injection drive in which the fuel injector drive applies a reverse current after the fuel injector is turned off to reduce valve closing delay caused by residual magnetic flux in the fuel injector, in accordance with the present disclosure.

FIG. 5 is directed toward a plot 500 of fuel injector parameters corresponding to a fuel injection event utilizing a non-optimum reverse current fuel injection drive in which the fuel injector drive applies a reverse current after the fuel injector is turned off to reduce valve closing delay caused by residual magnetic flux in the fuel injector. This method, however, not being optimized, results in poor correlation of the valve closing instant 512 to the peak reverse current point 522 or the coil voltage inflection point. Here the fuel injector valve closing time may not be easily correlated to the inflection point in the injector solenoid coil voltage after the coil current is turned off and falls to zero. The horizontal x-axis 502 of plot 500 depicts time over which a fuel injection event occurs. The vertical y-axis 504 is measured in differing units based on parameter being monitored. The driver command 506 is shown being switched between an inactive state 532 to an active state 530. When the driver command 506 is switched to the active state 530 the coil voltage 516 and search coil voltage 518 are shown to increase. Both the coil voltage 516 and search coil voltage 518 are measured in volts along y-axis 504 in relation to time 502. The coil current (amperes) 508 increases accordingly following driver command 506 being switched to an active state 530. The fuel injector reacts to the driver command 506 and begins injecting fuel as depicted by fuel rate 510. Fuel line pressure 520 is additionally depicted over time 502. When the driver command 506 is switched to an inactive state 532 the coil current 508 is turned off and falls to zero. The coil current 508 is then driven in a reverse direction. The coil current 508 reaches a peak reverse current point 522 but the fuel valve closes at instant 512. The fuel injector valve closing time 512 is correlated to the peak reverse current point 522 after the reverse current is passed through the coil and then falls to zero. Using this fuel injector drive reduces any valve closing delay resulting from residual magnetic flux within the fuel injector, however it results in poor correlation of the valve closing instant 512 to the peak reverse current point 522 or the coil voltage inflection point.

Figure 6:
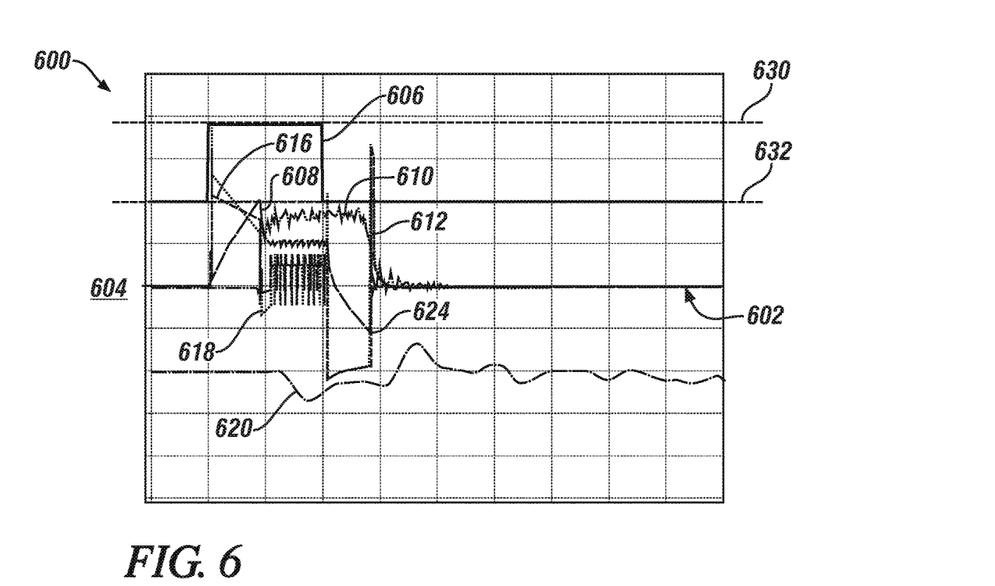
FIG. 6 illustrates a plot of fuel injector parameters corresponding to an exemplary fuel injection event utilizing an optimum reverse current fuel injection drive in which the fuel injector drive applies a reverse current after the fuel injector is turned off to reduce valve closing delay caused by residual magnetic flux in the fuel injector, in accordance with the present disclosure.

FIG. 6 is directed toward a plot 600 of fuel injector parameters corresponding to a fuel injection event utilizing an optimum reverse current fuel injection drive in which the fuel injector drive applies a reverse current after the fuel injector is turned off to reduce valve closing delay caused by residual magnetic flux in the fuel injector. Optimum reverse current drive is achieved by directly correlating the fuel injector valve closing time 612 to a time 624 where the peak reverse current reaches a predetermined value. The horizontal x-axis 602 of plot 600 depicts time over which a fuel injection event occurs. The vertical y-axis 604 is measured in units dependent on the parameter being monitored. The driver command 606 is shown being switched between an inactive state 632 to an active state 630. When the driver command 606 is switched to the active state 630 the coil voltage 616 and search coil voltage 618 are shown to increase. Both the coil voltage 616 and search coil voltage 618 are measured in volts along y-axis 604 in relation to time 602. The coil current (amperes) 608 increases accordingly following driver command 606 being switched to an active state 630. The fuel injector reacts to the driver command 606 and begins injecting fuel as depicted by fuel rate 610. Fuel line pressure 620 is additionally depicted over time 602. When the driver command 606 is switched to an inactive state 632 the coil current 608 is turned off and falls to zero. The coil current 608 is then driven in a reverse direction. When the coil current 608 reaches a peak reverse current point 624 which corresponds to a predetermined peak reverse current value the fuel valve closes at instant 612. The fuel injector valve closing time 612 is correlated directly to the peak reverse current point 624. Using this fuel injector drive reduces any valve closing delay resulting from residual magnetic flux within the fuel injector while additionally correlating the valve closing instant 612 to the peak reverse current point 624.

Figure 7:
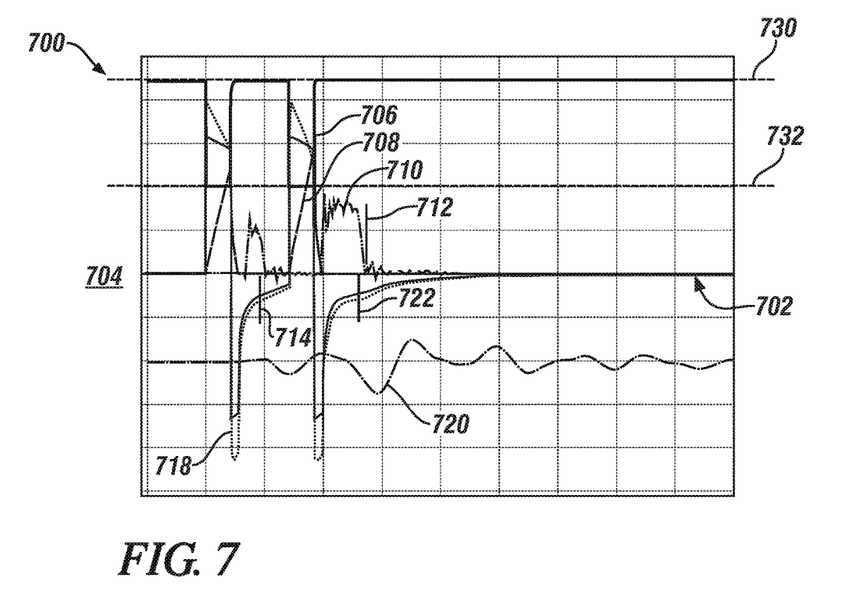
FIG. 7 illustrates a plot of fuel injector parameters corresponding to exemplary multiple small fuel injection events utilizing a fuel injection drive in which the fuel injector valve closing time is correlated to an inflection point in the injector solenoid coil voltage after the coil current is turned off and falls to zero, in accordance with the present disclosure.

FIG. 7 is directed toward a plot 700 of fuel injector parameters corresponding to multiple small fuel injection events utilizing a fuel injection drive in which the fuel injector valve closing time is correlated to an inflection point in the injector solenoid coil voltage after the coil current is turned off and falls to zero. Here the fuel injector drive uses the discernible residual voltage inflection point for determining stability in a fuel injection event between engine cycles as well as the EOI time of the fuel injection event. The horizontal x-axis 702 of plot 700 is measured in time. The vertical y-axis 704 is measured in differing units based on parameter being monitored. The driver command 706 is shown being switched between an inactive state 730 to an active state 732 for multiple fuel injection events. When the driver command 706 is switched to the active state 732 the coil voltage 716 and search coil voltage 718 are shown to increase. Both the coil voltage 716 and search coil voltage 718 are measured in volts along y-axis 704 in relation to time 702. The coil current (amperes) 708 increases accordingly following driver command 706 being switched to an active state 732. The fuel injector reacts to the driver command 706 and begins injecting fuel as depicted by fuel rate 710. Fuel line pressure 720 is additionally depicted over time 702. When the driver command 706 is switched to an inactive state 730 the coil current 708 is turned off and falls to zero. When the fuel valve closes after a first fuel injection event the first voltage inflection point 714 is achieved at the instant corresponding to the fuel valve closing. When the fuel valve closes after a second fuel injection event the second voltage inflection point 722 is achieved at the instant corresponding to the fuel valve closing. The fuel injector valve closing time can't be correlated easily to the inflection points 714, 722 in the injector solenoid coil voltage under multiple quantity injection conditions due to the difficulty in determining the point of inflection.

Figure 8:
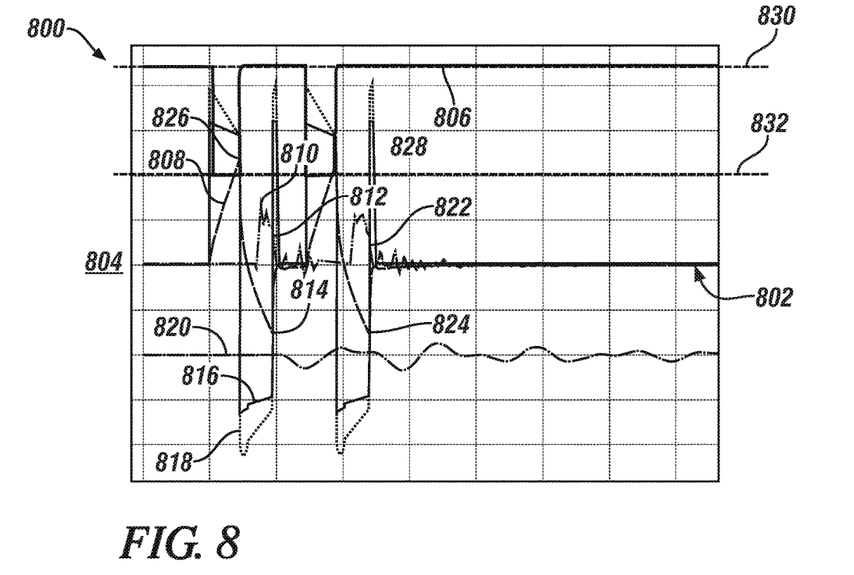
FIG. 8 illustrates a plot of fuel injector parameters corresponding to exemplary multiple small fuel injection events utilizing an optimum reverse current fuel injection drive in which the fuel injector drive applies a reverse current after the fuel injector is turned off to reduce valve closing delay caused by magnetic flux in the fuel injector, in accordance with the present disclosure.

FIG. 8 is directed toward a plot 800 of fuel injector parameters corresponding to multiple small fuel injection events utilizing an optimum reverse current fuel injection drive in which the fuel injector drive applies a reverse current after the fuel injector is turned off to reduce valve closing delay caused by magnetic flux in the fuel injector. Optimum reverse current drive is achieved by directly correlating the fuel injector valve closing times 812, 822 to times 814, 824 where the peak reverse current reaches a predetermined value. The horizontal x-axis 802 of plot 800 depicts time over which a fuel injection event occurs. The vertical y-axis 804 is measured in units dependent on the parameter being monitored. The driver command 806 is shown being switched between an inactive state 830 to an active state 832. When the driver command 806 is switched to the active state 832 the coil voltage 816 and search coil voltage 818 are shown to increase. Both the coil voltage 816 and search coil voltage 818 are measured in volts along y-axis 804 in relation to time 802. The coil current (amperes) 808 increases accordingly following driver command 806 being switched to an active state 832. The fuel injector reacts to the driver command 806 and begins injecting fuel as depicted by fuel rate 810. Fuel line pressure 820 is additionally depicted over time 802. When the driver command 806 is switched to an inactive state 830 the coil current 808 is turned off and falls to zero. The coil current 808 is then driven in a reverse direction. When the coil current 808 reaches a peak reverse current point 814, 824 which corresponds to a predetermined peak reverse current value the fuel valve closes at the respective instant 812, 822. The fuel injector valve closing time 812, 822 is correlated directly to the peak reverse current point 814, 824. Using this fuel injector drive reduces any valve closing delay resulting from residual magnetic flux within the fuel injector while additionally correlating the valve closing instant 812, 822 to the peak reverse current point 814, 824 over multiple small quantity injections. This enables consistent multiple small quantity injections as the fuel injector valve closing time is correlated directly to a time where the peak reverse current reaches a predetermined value.

The duration of the reverse voltage after the injector has been commanded off is determined based on the time it takes the coil current to reach a predetermined value in the reverse direction. The predetermined reverse current may be determined using various methods. In one embodiment, the predetermined reverse current is so selected that when the reverse voltage is switched off at the instant the reverse current reaches said predetermined value in the reverse direction, the coil voltage returns to zero in the shortest time without having any further undershoot after being clamped in the forward direction at the supply voltage until the current is reduced to zero. In another embodiment, the predetermined reverse current is so selected that when the reverse voltage is switched off at the instant the reverse current reaches the predetermined value in the reverse direction, the flux linking the coil reaches a predetermined value in the second direction within a predetermined time.

Figure 9:
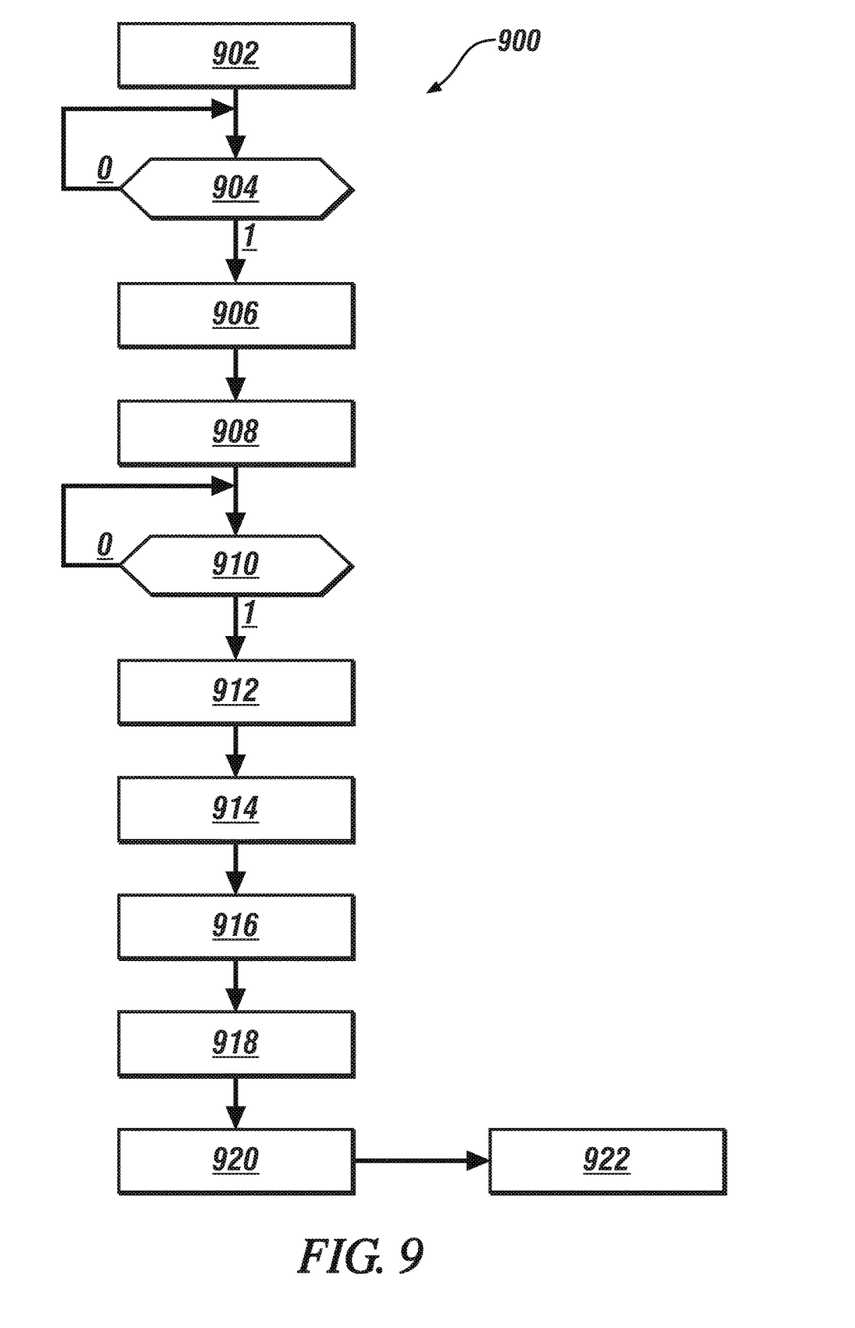
FIG. 9 illustrates a flowchart of an exemplary embodiment of determining a predetermined reverse current, in accordance with the present disclosure.

FIG. 9 depicts a flowchart 900 of an exemplary embodiment wherein the predetermined reverse current is so selected that when the reverse voltage is switched off at the instant the reverse current reaches the predetermined level, and a next closely spaced injection with equal commanded duration is initiated, the next peak current in the first direction reaches within a predetermined band of the previous peak current in the same direction. The exemplary flowchart 900 can be described with reference the fuel injector 10 and activation controller 80 of FIG. NA. The exemplary flowchart achieves the selection of the predetermined reverse current using closed loop control with proportional-integral control on the error in successive peak current levels in the multiple closely spaced injection events. The exemplary flowchart can be implemented within, and executed by, any combination of the control module 50 and external ECM of FIG. 1A. Table 1 is provided as a key to FIG. 9 wherein the numerically labeled blocks and the corresponding functions are set forth as follows.

TABLE 1

| BLOCK | BLOCK CONTENTS |
|---|---|
| 902 | Start on cylinder event, set $\Delta I_p(0) = 0$; $I_{rev} = I_{rev\_min}$ |
| 904 | $t = T_{p1}$? |
| 906 | Read $I_{p1}$ |
| 908 | Store $I_{p1}$ |
| 910 | $t = T_{p1} + T_{event}$? |
| 912 | Read $I_{p2}$ |
| 914 | Store $I_{p2}$ |
| 916 | $\Delta I_p(n) = I_{p1} - I_{p2}$ |
| 918 | $I_{rev}(n) = I_{rev}(n-1) + k_p[\Delta I_p(n) - \Delta I_p(n-1)] + k_p * T_s * \Delta I_p(n)$ |
| 920 | $\Delta I_p(n-1) = \Delta I_p(n)$ |
| 922 | Return |

The flowchart 900 begins with a start on cylinder event at block 902 and the initial peak current $\Delta I_p(0)$ is set to 0 and the reverse current $I_{rev}$ is set to $I_{rev\_min}$. At block 904 the time t is monitored and it is determined whether the time is equal to the time a peak current is achieved $T_{p1}$ in a first injection event of multiple injection events. If $t=T_{p1}$ the flowchart proceeds to block 906 where the peak current at the first injection event $I_{p1}$ is read and then stored at block 908. If time t is not equal to $T_{p1}$ at block 904 then the time continues to be monitored until $t=T_{p1}$. Once the peak current at the first injection event has been read and stored the flowchart proceeds to block 910 where the time t is monitored and it is determined whether the time is equal to the time the peak current is achieved in a first injection event $T_{p1}$ plus the time of the injection event $T_{event}$, which is the amount of time between the time of the peak current in the first injection event and the time of the peak current in a second injection event $T_{p2}$. Accordingly, the peak current in the second injection event $T_{p2}$ is achieved when $t=T_{p1}+T_{event}$. If $t=T_{p1}+T_{event}$ the flowchart proceeds to block 912 where the peak current at the second injection event $I_{p2}$ is read and then stored at block 914. If time t is not equal to $T_{p1}+T_{event}$ at block 910 then the time continues to be monitored until $t=T_{p1}+T_{event}$. Once the peak current at the second injection event $I_{p2}$ is read and then stored at block 914 the flowchart proceeds to block 916 where the change in peak current between the injection events $\Delta I_p(n)$ is set to the difference between the peak current at the first injection event $I_{p1}$ and the peak current at the second injection event $I_{p2}$. At block 918 digital proportional-integral control is utilized to drive error in a positive peak current to zero. This may be expressed by the following relationship.

$$I_{rev}(n)=I_{rev}(n-1)+k_p[\Delta I_p(n)-\Delta I_p(n-1)]+k_I\times T_s\times\Delta I_p(n) \quad [1]$$

At each iteration n the reverse current $I_{rev}$ (n) is determined based on this proportional integral control relationship wherein $k_p$ and $k_i$, denote the coefficients for the proportional and integral terms respectively. This will drive the error in successive positive peak current levels to zero. Accordingly the resulting drive signal based on this predetermined reverse current will be enable precision fuel metering and injection control over multiple closely spaced injection events.

At block 920 the change in peak current of the current injection event $\Delta I_p(n)$ is set equal to the change in peak current of a previous iteration $\Delta I_p(n-1)$. At block 922 the process returns and may be executed again for a subsequent injection event.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for controlling an actuator event of an electromagnetically-activated actuator, including an electrical coil, an armature moveable between rest and actuated positions, and a bi-directional driver, comprising:
   applying a supply voltage at a first polarity across the coil for a first duration to drive a forward current through the coil effective to move the armature away from the rest position, said forward current having a forward current peak at the end of said first duration; and
   after said first duration, applying the supply voltage at a second polarity across the coil for a second duration to drive a reverse current through the coil, said second duration terminating when the reverse current attains a predetermined reverse current peak, wherein the predetermined reverse current peak is coincident with the instant the armature reaches the rest position.

2. The method of claim 1 wherein the predetermined reverse current peak corresponds to a self-induced voltage across the coil returning to zero in a minimum amount of time without having any further undershoot after being clamped at the supply voltage until the reverse current through the coil is reduced to zero.

3. The method of claim 1 wherein said predetermined reverse current peak corresponds to a subsequent application of the supply voltage at the first polarity across the coil for a third duration equivalent to the first duration which results in a second forward current peak that is within a predetermined band of said first forward current peak.

4. The method of claim 1 wherein said predetermined reverse current peak is determined in a closed-loop control with proportional-integral control on an error in successive forward current peaks in multiple closely spaced actuator events.

5. The method of claim 1 wherein the predetermined reverse current peak is determined such that subsequent to said second duration a magnetic flux passing through the armature reaches a predetermined value within a predetermined time.

6. The method of claim 1 wherein the forward current peak is coincident with movement of the armature away from the rest position.

7. The method of claim 1 wherein the bi-directional driver comprises an H-bridge driver having four solid-state switches with respective free-wheeling diodes.

8. A method for controlling an injection event of an electromagnetically-activated fuel injector, including an electrical coil, a valve moveable between closed and open positions, and a bi-directional driver, comprising:
   applying a supply voltage at a first polarity across the coil for a first duration to drive a forward current through the coil effective to move the valve away from the closed position, said forward current having a forward current peak at the end of said first duration; and
   after said first duration, applying the supply voltage at a second polarity across the coil for a second duration to drive a reverse current through the coil, said second duration terminating when the reverse current attains a predetermined reverse current peak, wherein the predetermined reverse current peak is coincident with the instant the valve reaches the closed position.

9. The method of claim 8 wherein the predetermined reverse current peak corresponds to a self-induced voltage across the coil returning to zero in a minimum amount of time without having any further undershoot after being clamped at the supply voltage until the reverse current through the coil is reduced to zero.

10. The method of claim 8 wherein said predetermined reverse current peak corresponds to a subsequent application of the supply voltage at the first polarity across the coil for a third duration equivalent to the first duration which results in a second forward current peak that is within a predetermined band of said first forward current peak.

11. The method of claim 8 wherein said predetermined reverse current peak is determined in a closed-loop control with proportional-integral control on an error in successive forward current peaks in multiple closely spaced injector events.

12. The method of claim 8 wherein the predetermined reverse current peak is determined such that subsequent to said second duration a magnetic flux passing through the armature reaches a predetermined value within a predetermined time.

13. The method of claim 8 wherein the forward current peak is coincident with movement of the valve away from the closed position.

14. The method of claim 8 wherein the bi-directional driver comprises an H-bridge driver having four solid-state switches with respective free-wheeling diodes.

15. A fuel injection system, comprising:
an electromagnetically-activated fuel injector, comprising an electrical coil, and a valve moveable between closed and open positions;
a bi-directional driver;
a control module configured to:
control the bi-directional driver to apply a supply voltage at a first polarity across the coil for a first duration to drive a forward current through the coil effective to move the valve away from the closed position, said forward current having a forward current peak at the end of said first duration; and
after said first duration, apply the supply voltage at a second polarity across the coil for a second duration to drive a reverse current through the coil, said second duration terminating when the reverse current attains a predetermined reverse current peak, wherein the predetermined reverse current peak is coincident with the instant the valve reaches the closed position.

16. The fuel injection system of claim 15 wherein the predetermined reverse current peak corresponds to a self-induced voltage across the coil returning to zero in a minimum amount of time without having any further undershoot after being clamped at the supply voltage until the reverse current through the coil is reduced to zero.

17. The fuel injection system of claim 15 wherein said predetermined reverse current peak corresponds to a subsequent application of the supply voltage at the first polarity across the coil for a third duration equivalent to the first duration which results in a second forward current peak that is within a predetermined band of said first forward current peak.

18. The fuel injection system of claim 15 wherein said predetermined reverse current peak is determined in a closed-loop control with proportional-integral control on an error in successive forward current peaks in multiple closely spaced injector events.

19. The fuel injection system of claim 16 wherein the predetermined reverse current peak is determined such that subsequent to said second duration a magnetic flux passing through the armature reaches a predetermined value within a predetermined time.

20. The fuel injection system of claim 15 wherein the forward current peak is coincident with movement of the valve away from the closed position.

* * * * *